Figure 1:
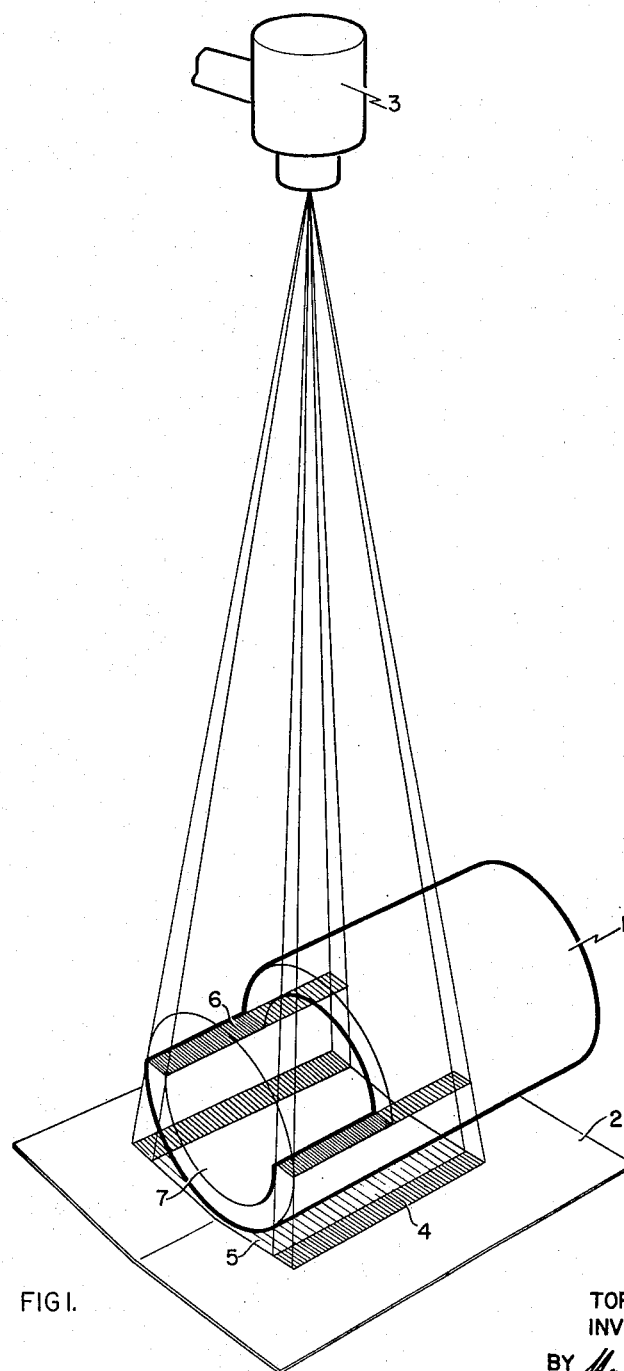

Oct. 25, 1960  T. ARNESEN  2,957,987
METHOD OF DETERMINING METAL THICKNESS, SCALING
AND DEPOSITS IN PIPING

Filed Feb. 14, 1958  2 Sheets-Sheet 1

TORE ARNESEN
INVENTOR

BY

PATENT AGENT

United States Patent Office 2,957,987
Patented Oct. 25, 1960

2,957,987

METHOD OF DETERMINING METAL THICKNESS, SCALING, AND DEPOSITS IN PIPING

Tore Arnesen, 280 Tecumseh St., Sarnia, Ontario, Canada

Filed Feb. 14, 1958, Ser. No. 715,279

3 Claims. (Cl. 250—65)

This invention relates to the ascertainment of wall thickness of pipes and more particularly to a method of gamma ray inspection of industrial piping as will permit the ready and accurate determination of the precise metal thickness, as well as the degree of scaling, pitting, corrosion and sediment deposit present.

The importance of being able to ascertain precise wall thickness of industrial piping and thus the degree of corrosion thereof is well known in many industries. Many methods have been evolved to ascertain this quantity. In addition, however, there are many industrial processes wherein, while corrosion of pipes may or may not be an important factor, the pipes carry fluids or other material which tends to form a deposit of sediment on the inside pipe walls eventually partially or totally plugging the pipe. Methods adapted to determine the degree of such plugging have also been developed and are in use today.

In most commercially employed processes for determining pipe wall thickness, of which I am aware, however, it is necessary to shut down the plant or at least the section of piping being inspected.

In addition to the obvious disadvantage inherent in necessitating full or partial shut-down, no commercially used inspection method of which I am aware is able to differentiate between wall thickness and scaling while measuring and recording these separate factors simultaneously. In other words, the commercial methods now used, while they do give an indication of the thickness of metal plus scale or sediment, do not afford a ready and reliable distinction between these two factors whereby both thickness of the pipe and the degree of scaling may be individually and simultaneously recorded and measured.

Furthermore, many of the commercially used methods of corrosion inspection of which I am aware are not readily adaptable to pipes of different sizes. Thus in order to make a complete plant inspection by such methods often substantial changes in the construction and/or operation of the equipment is required to permit inspection of the entire range of piping in a plant.

Another disadvantage of many of the now employed methods is the fact that extensive changes are often required to permit inspection of pipes of different material. In at least one of the methods of which I am aware an almost precise knowledge of the exact alloy of the pipe is required before the test can be carried out with a reasonable expectation of success.

In addition prior methods of pipe inspection have proved to be expensive, complicated and require the use of specially designed equipment and extensive and expensive preparations.

It is a principal object of this invention therefore to provide a method whereby the precise wall thickness and degree of scaling of piping may be simultaneously ascertained while the piping is in normal usage.

It is another object of this invention to provide such a method as will be immediately adaptable to pipes of any and varying diameters, regardless of flowing media or temperatures.

It is a still further object of the invention to provide such a method as will be relatively unaffected by the pipe material.

It is a still further object of the invention to provide such a method as may be carried out with conventional equipment readily available and thus a relatively inexpensive manner.

Figure 2:
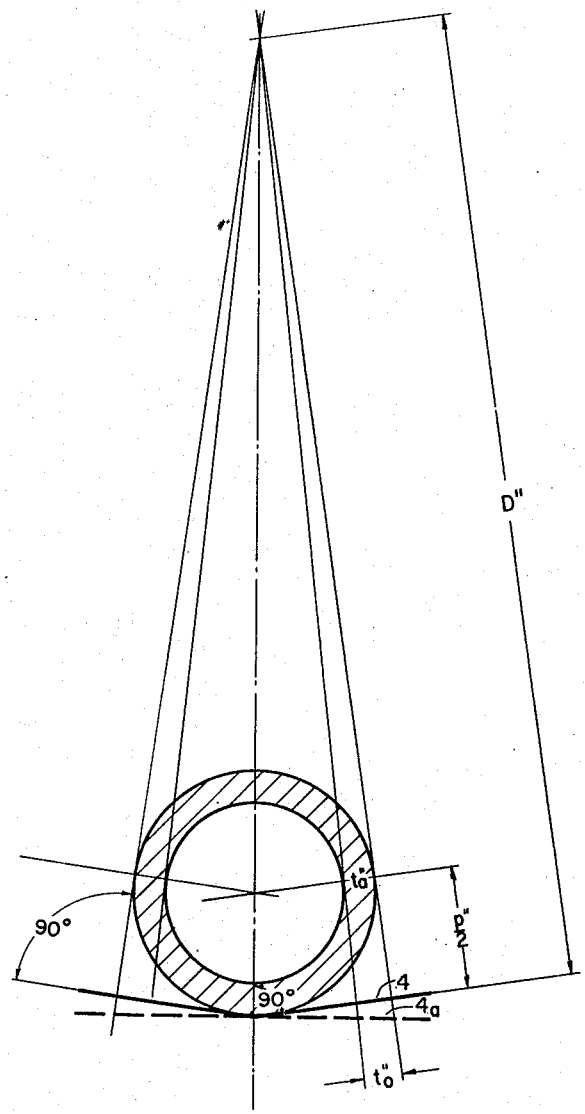

These and other advantages objects will become apparent through a consideration of the following detailed description taken in conjunction with the attached drawings in which:

Figure 1 is a perspective view showing the application of the method to determine the thickness of a section of pipe and in which a portion of the pipe is shown partly in section; and Figure 2 is a diagrammatic view of the application of Figure 1 designed to illustrate the trigonometric calculation required to correct observed degrees of wall thickness and scaling to the actual figures.

The invention consists broadly in a method of gamma ray inspection of piping to ascertain wall thickness and scaling which comprises placing a substantially flat gamma ray sensitive photographic plate tangentially against the pipe on one side thereof, bombarding the pipe with the gamma rays from a point diametrically opposite, developing the plate, and trigonometrically correcting the observed apparent metal thickness and/or scaling recorded in the developed plate to obtain the true wall thickness and extent of scaling.

In greater detail, now and referring to the drawings, 1 indicates a pipe the true wall thickness of which is sought to be determined by the methods of this invention. According to the method of the invention a substantially flat photographic gamma ray sensitive plate 2 is placed against the pipe to extend substantially tangentially thereto. A conventional gamma ray source 3 is placed diametrically opposite the plate and at a predetermined distance therefrom and the plate is bombarded with gamma rays through the pipe for a period of time sufficient to record an impression on the plate. As may be seen by reference to the drawings and for reasons which will become apparent hereafter the gamma ray source is placed diametrically opposite the point of contact between the plate and the pipe so that the gamma rays tangential to the outer walls of the pipe shown diagrammatically in Figure 1 are substantially at right angles to the plate. If the gamma rays are supplied for a sufficient period of time, the plate after being developed will possess a dark zone 4 and a lighter zone 5 related to the wall thickness 6 and the inside diameter 7 of the pipe. This observed apparent wall thickness 4 must be noted and then in the manner described hereafter related to the true wall thickness 6 by a trigonometric correction.

If the gamma ray source is placed a sufficient distance from the pipe relative to the pipe diameter it may be assumed that the gamma ray tangential to the outer pipe walls strike the plate at right angles. The very small error occasioned by this assumption will not be significant provided that the source is sufficiently removed from the pipe relative to the pipe diameter. If for any reason, however, it is undesirable or inconvenient to place the gamma ray source a significant distance from the pipe, the plate could be bent angularly as has been done in Figure 1 to ensure that the gamma rays tangential to the outside pipe diameter strike the plate precisely at right angles on both sides of the pipe. It will be appreciated that this relationship greatly simplifies the correction required as outlined hereafter.

The distance of the gamma ray source from the pipe, will, as has been stated, be related to the pipe diameter.

I have found in practice that for pipes of up to 6 inches in diameter a plate which is not bent can be used if the gamma ray source is placed about 2 feet from the plate. The error in assuming that the gamma rays which will strictly only be perpendicular at the point of contact between the plate and the pipe are also perpendicular at the outside tangents to the pipe, will be less than $\frac{1}{5}$ of 1% which can be ignored as a practical matter.

The gamma ray source, since it does not form part of this invention in itself is not here described in detail. It may be of any of the many commercial types of gamma ray source now readily commercially available. The characteristics of the precise source used will determine the longitudinal length of the pipe which can be inspected by a single plate. The number of plates used depends upon the importance of the project and the demands of the plant management with respect to thoroughness and completeness.

As has already been pointed out the observed pipe thickness 4 must be related to the actual thickness by a trigonometric calculation. The basis for this calculation is shown in Figure 2. Assuming that the gamma ray source is placed a distance D inches from the plate that the observed apparent thickness 4 recorded on the plate is $T_0$ inches and that the outside diameter of the pipe is P inches the actual thickness of the pipe wall $T_a$ will be $$T_a = \frac{T_0\left(D - \frac{P}{2}\right)}{D}$$

By way of example, suppose the wall thickness $T_0$ observed and measured on the developed film is .500 inch the distance D, between source and plate is 25 inches and the outside diameter is 5½ inches. The actual wall thickness will be:

$$T_a = \frac{.500(25 - 2.75)}{25} \text{ or } .445 \text{ inch}$$

This correcting factor is based on the assumption that the film will be bent as shown in Figure 2 and that the gamma rays tangential to the outside walls of the pipe are at 90° to the plate. As has already been pointed out, the use of a flat plate not so bent (which is shown in a dotted line in Figure 2) and in which the source is diametrically perpendicular to the point of contact between the plate and the pipe will result in an error of less than $\frac{1}{5}$ of 1% if the same correcting factor is used and applied to the observed wall thickness 4A.

The correcting factor will require an obvious compensation in the case of insulated pipe. In this case the correcting factor will be.

$$T_a = \frac{T_0(D - (P/2 + T_1))}{D}$$

where $T_1$ is the thickness of the insulation.

Since this method of gamma ray inspection will result in the recording of a different image for scaling than for wall thickness because of the different resistivity to gamma rays, in the case of a pipe in which scaling is present there will be observed both an apparent wall thickness and an apparent scaling. Both these apparent figures can be corrected and ascertained individually in the manner already described.

It will therefore be seen that the use of the method of the invention affords the advantages set out as objects of the invention and obviates many of the disadvantages inherent in former practice while providing a quick accurate and relatively inexpensive method heretofore unattainable.

The invention has been described with reference to preferred embodiments. For instance, the invention has been described with the employment of gamma rays. It is to be understood that the invention is not limited to such embodiments. Obviously, X-rays will be equally effective and when here and elsewhere I use the term "gamma rays" it is to be construed as including X-rays. Such embodiments of the invention which come within the scope and purview of the appended claims are to be considered as part of this invention.

What I claim as my invention is:

1. A method of distinguishing pipe wall lamina and ascertaining the thickness thereof which comprises fixedly positioning a point source of penetrating high energy rays on one side of a pipe, fixedly positioning a photographic plate sensitive to said rays on the opposite side of said pipe to project a substantial distance on opposite sides thereof, to be parallel to the pipe axis and to be substantially perpendicular to the rays tangentially intersecting the pipe wall emanating from said ray source, bombarding said pipe with said emanating rays to form on said photographic plate a latent image of a cross-section of said pipe, said image including a distinguishable substantially undistorted representation of the cross-sections of said pipe wall lamina, and developing said plate to render said latent image visible whereby by measuring the width of a defined lamina cross-section image the actual width of said lamina may be mathematically computed.

2. A method of distinguishing pipe wall lamina and ascertaining the thickness thereof which comprises fixedly positioning a point source of penetrating high energy rays on one side of a pipe of diameter P, fixedly positioning a photographic plate sensitive to said rays adjacent the opposite side of said pipe to project a substantial distance on opposite sides thereof, to be parallel to the pipe axis and to be substantially perpendicular to the rays tangentially intersecting the pipe wall emanating from said ray source, said plate there being at a distance D from said ray source, bombarding said pipe with said emanating rays to form on said photographic plate a latent image of a cross-section of said pipe, said image including a distinguishable representation of the cross-sections of said pipe wall lamina, and developing said plate to render said latent image visible whereby by measuring the width $T_0$ of a defined lamina cross-section image the actual width $T_a$ of said lamina may be computed from the formula $$T_a = \frac{T_0(D - P/2)}{D}$$

3. A method of distinguishing pipe wall lamina and ascertaining the thickness thereof which comprises fixedly positioning a point source of penetrating high energy rays on one side of a pipe of diameter P, fixedly positioning a photographic plate sensitive to said rays at a distance $T_1$ from the opposite side of said pipe to project a substantial distance on opposite sides thereof, to be parallel to the pipe axis and to be substantially perpendicular to the rays tangentially intersecting the pipe wall emanating from said ray source, said plate there being at a distance D from said ray source, bombarding said pipe with said emanating rays to form on said photographic plate a latent image of a cross-section of said pipe, said image including a distinguishable representation of the cross-section of said pipe wall lamina, and developing said plate to render said latent image visible whereby by measuring the width $T_0$ of a defined lamina cross-section image the actual width $T_a$ of said lamina may be computed from the formula $$T_a = \frac{T_0(D - (P/2 + T_1))}{D}$$

References Cited in the file of this patent

UNITED STATES PATENTS 2,462,088    Friedman _____ Feb. 22, 1949

(Other references on following page)

UNITED STATES PATENTS

| | | |
|---|---|---|
| 2,475,596 | Dawson | July 12, 1949 |
| 2,486,902 | Wolf | Nov. 1, 1949 |
| 2,506,749 | Schulman et al. | May 9, 1950 |
| 2,525,292 | Fua et al. | Oct. 10, 1950 |
| 2,675,479 | Stewart et al. | Apr. 13, 1954 |
| 2,748,290 | Reichertz | May 29, 1956 |
| 2,812,440 | Hartman | Nov. 5, 1957 |

OTHER REFERENCES

Rooksby et al.: Journal of Scientific Instruments, vol. 18, No. 3, March 1941, page 38.

Ohmart: "The Use of Gamma Radiation for Density Measurement," Nondestructive Testing, September, October 1957.